Oct. 22, 1957 H. L. LAMBERT ET AL 2,810,466
OPERATION CONTROLLING MECHANISM FOR
TYPEWRITERS OR LIKE MACHINES
Filed Jan. 26, 1955 3 Sheets-Sheet 3
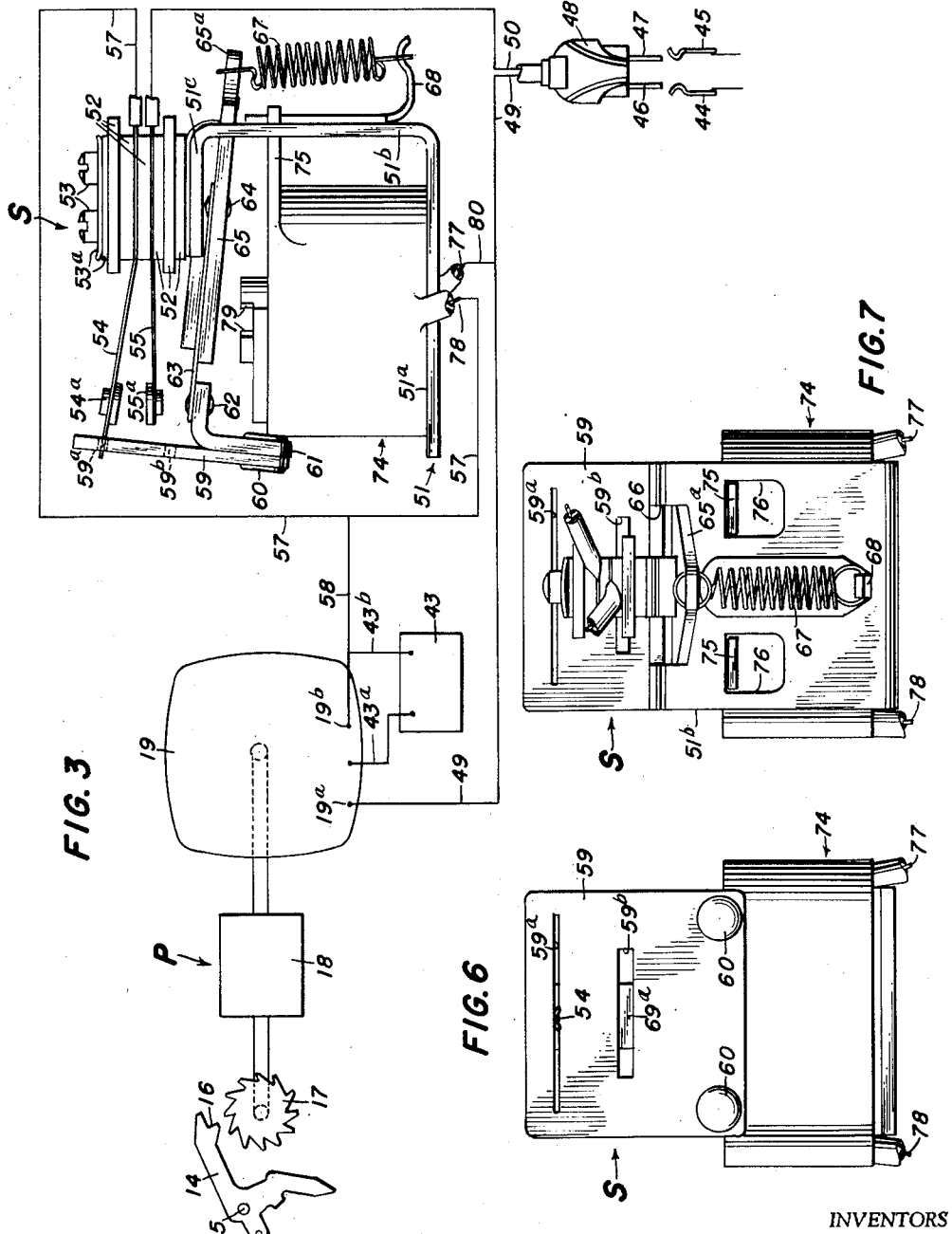
INVENTORS
HARRY L. LAMBERT
WILLIAM O. MOSHER
BY
Baldwin & Wight
ATTORNEYS U n i t e d   S t a t e s   P a t e n t   O f f i c e 2,810,466
Patented Oct. 22, 1957

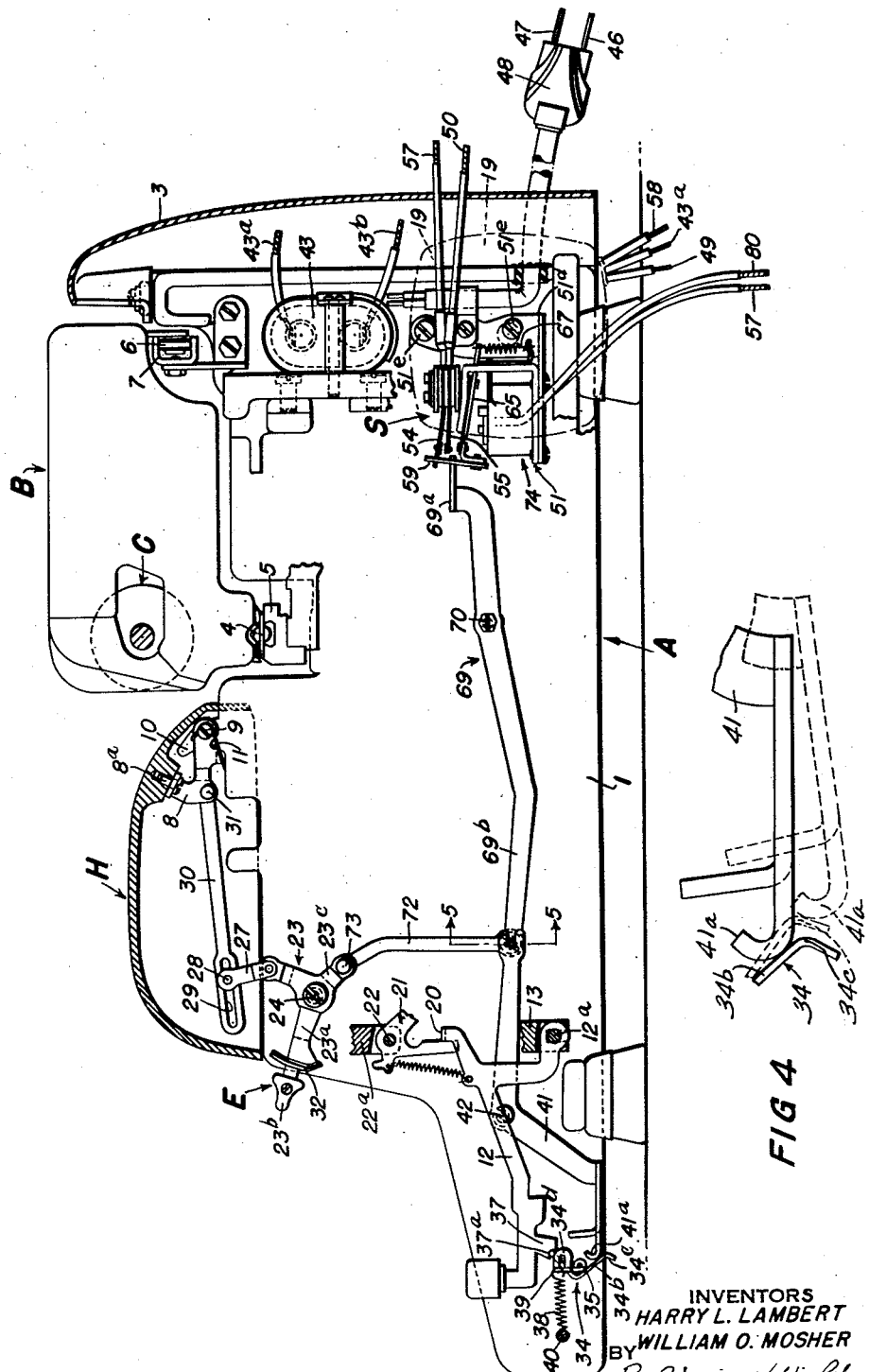

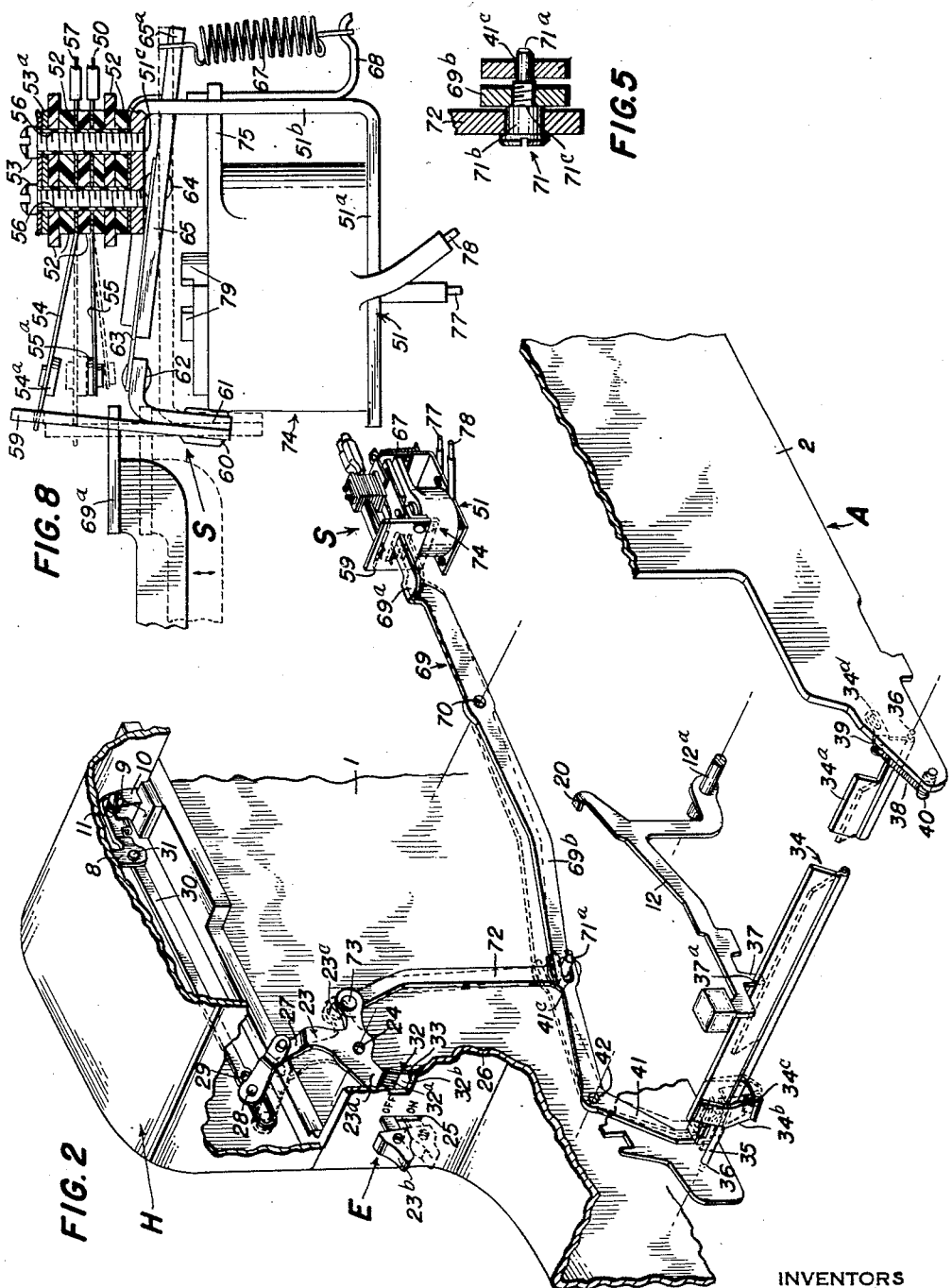

2,810,466

OPERATION CONTROLLING MECHANISM FOR TYPEWRITERS OR LIKE MACHINES

Harry L. Lambert, West Hartford, and William O. Mosher, Wethersfield, Conn., assignors to Royal McBee Corporation, New York, N. Y., a corporation of New York Application January 26, 1955, Serial No. 484,186

19 Claims. (Cl. 197—17)

This invention relates to operation controlling mechanism for typewriters or like machines, and more particularly to mechanism including electromagnetic means cooperative with other parts for conditioning such a machine selectively for operation or for non-operation.

Many electrically operated typewriters include electrically powered operating means for driving the various machine instrumentalities, such as the type bars, carriage return mechanism, and so forth. Usually, the operating means is driven continuously when the machine is conditioned for operation, the actuation of an instrumentality being effected by key-controlled engagement of an actuator with a continuously driven member, for example a roller or toothed snatch roll. If an actuator is released by key operation when the power supply is cut off, for example by unplugging of the extension cord from a wall socket, the actuator may remain in engagement with the driving member so that upon restoration of the power supply and operation of the driving member the actuator and its associated instrumentality will be operated. Since this may be unexpected, the typist may be startled or even injured, as for example if the operator were examining the machine closely and the carriage were suddenly returned without warning.

It previously has been proposed to provide electromagnetic means controlled by power being delivered to the electrically powered operating mechanism and responsive to cessation of delivery of power for locking the keys of a typewriting machine against operation. An object of the present invention is to provide improved electromagnetic means controlled by the cessation of delivery of power to an electrically operated typewriter or like machine for automatically restoring the machine parts to positions corresponding to non-operation of the machine.

Another object of the invention is to provide mechanism of the kind referred to adapted automatically to restore a master control device to normal position, corresponding to non-operation of the machine, in response to interruption of the power supply to the driving motor, irrespective of the cause of power supply interruption.

A further object of the invention is to provide mechanism of the character stated in which the electromagnetic means may assist the manual moving of a master control device from one position to another.

Other objects of the invention will become apparent from a reading of the following description, the appended claims, and the accompanying drawings, in which:

Figure 1 is a vertical sectional view fore and aft of a typewriting machine embodying the invention, some parts being shown in elevation and certain conventional parts being omitted;

Figure 2 is a fragmentary perspective view of certain of the mechanism shown in Figure 1 with parts of a typewriter frame or housing broken away, certain operating mechanism being shown in full lines in position corresponding to non-operation of the machine and being shown in dotted lines in the position occupied when the machine is conditioned for operation;

Figure 3 is a view showing a switch and associated electromagnet in side elevation on an enlarged scale in conjunction with a wiring diagram and schematic illustration of electrically powered operating mechanism;

Figure 4 is a fragmentary elevational view of a key controlling element or locking blade and an associated lever;

Figure 5 is a fragmentary sectional view on the line 5—5 of Figure 1 drawn on an enlarged scale;

Figure 6 is a front elevational view of the switch and electromagnet mechanism shown in Figure 3;

Figure 7 is a rear elevational view of the switch and electromagnet shown in Figures 3 and 6; and Figure 8 is a view partly in vertical fore and aft section and partly in side elevation of the switch and electromagnet mechanism.

A preferred constructional form of the invention is shown as being embodied in an electric typewriter having a construction generally similar to the known construction of Royal electric typewriters. Only some of the conventional typewriter parts are shown as including a main frame A having a left side wall 1, a right side wall 2 and a rear wall 3. A carriage B equipped with a platen C is mounted for letter spacing and return travel on the frame by antifriction balls 4 arranged to run on a front bottom track rail 5, the rear part of the carriage B being mounted on the frame by rollers 6 journalled on the carriage and adapted to roll upon a rear track rail 7 supported on the frame A. Mounted on frame A is a top cover or hood H the rear part of which is hinged to the frame adjacent to the side walls 1 and 2 to permit the hood to be swung upwardly from the front so that the operator may clean the type heads or replace ribbon spools, not shown. One of the hinges is shown in Figures 1 and 2 as comprising a hinge plate 8 secured to the hood by a screw $8^a$, a hinge pin 9, and a hinge standard 10 extending upwardly from the frame A. A spring 11 coiled around the hinge pin 9 cooperates with the hinge plate 8 and the hinge standard 10 for yieldably urging the hood H to its open position in the usual manner. A similar spring urged hinge structure, not shown, is provided adjacent the right side of the machine. A latching device or keeper (not shown), which may be of the kind shown in the patent to Hart and Kupper No. 2,568,002 dated September 18, 1951, may be provided for releasably maintaining the hood in its closed position.

The machine is provided with the usual typewriter instrumentalities such as type bars, carriage driving mechanism, ribbon feeding mechanism and so on controlled by the usual finger keys. In the interest of clarity of disclosure many of the various instrumentalities, which may be of known or any suitable form, are not shown in the drawings; but one finger key lever 12 which cooperates with mechanism embodying the invention is shown in Figures 1 and 2 as being pivoted at $12^a$ on a frame cross bar 13. It will be understood that the key 12 may be considered as being representative of the other keys of a full complement of keys which may be constructed and mounted similarly to the key 12.

The typewriter instrumentalities are drivable under the control of the finger keys by electrically powered operating mechanism generally designated P in Figure 3. The operating mechanism includes a pawl 14 pivoted at 15 on a movable actuator, not shown, which may be connected to a typewriter instrumentality such as a type bar. The nose 16 of the pawl 14 normally is disposed out of engagement with a toothed snatch roll 17 drivable through variable speed transmission mechanism 18 by a motor 19. Operation of the pawl 14 and the associated typewriter instrumentalities, not shown, may be effected by depressing the key 12 so as to cause an ear 20 at the rear end of the key lever to operate a lever 21 pivoted at 22 on a frame cross bar 22$^a$ to cause the pawl nose 16 to engage the rotating snatch roll 17, whereupon the pawl 14 is moved bodily toward the left as viewed in Figure 3 and operates the associated actuator and typewriter instrumentality, not shown. The variable speed drive transmitting mechanism 18 may be of any suitable form, for example it may be as disclosed in the patent to Hart 2,573,197 granted October 30, 1951, or may be of the form shown in the copending application of Harry L. Lambert, Serial No. 459,226 filed September 30, 1954, now U. S. Patent No. 2,749,762.

Mechanism disclosed herein resembles mechanism disclosed in the patent to Hart and Kupper No. 2,568,002, to the extent that it includes interlocking means for automatically disabling the machine, that is cutting off the supply of power to the operating means when the hood H is raised, and thereby eliminates or minimizes the danger that an operator may be injured by inadvertent actuation of some machine part when cleaning the type heads, changing a ribbon, or performing some other service or maintenance operation. As shown in Figures 1 and 2, the safety mechanism includes a master control device E comprising a lever 23 pivoted at 24 on the frame side wall 1 and having a forwardly extending arm 23$^a$ projecting through an opening 25 in the typewriter front frame or mask wall 26, the arm 23$^a$ being provided in front of the wall 26 with a finger piece 23$^b$. An arm 27 extending upwardly from and forming a part of the lever 23 is provided at its upper end with a pin 28 which extends into a slot 29 formed in the front end of a link 30 the rear end of which is pivoted at 31 to the hinge plate 8. A signal plate 32 formed on the lever arm 23$^a$ is positioned behind an opening or window 33 in the frame or mask wall 26, and is provided with areas 32$^a$ and 32$^b$ of distinctive appearances, such as being of different colors as indicated in Figure 2. The frame wall 26 may also be provided adjacent the window 33 with the designations "off" and "on" with which the master control device E may register selectively according to whether the machine is not in use or whether it is conditioned for operation.

When the parts are in the positions shown in Figure 1 and in full lines in Figure 2 the master control device E registers with the designation "off," and a relatively light colored area 32$^b$ of the signal plate 32 registers with the window 33, corresponding to non-operation of the machine. With the parts so positioned, the pin 28 at the upper end of the lever arm 27 is disposed near the rear end of the slot 29 so that the hood H may be raised as will be permitted by sliding of the forward end of the link 30 on the pin 28. When the control device E is moved to the position shown in dotted lines in Figure 2, for conditioning the machine for operation in a manner to be described later, it will register with the "on" designation and the relatively dark area 32$^a$, colored red for example, will be displayed at the window 33. The upper arm 27 of the lever 23 will be positioned as shown in dotted lines in Figure 2 so that the pin 28 will be in engagement with the front end of the slot 29 in the link 30. Consequently, if the hood is raised when the device E is in its "on" position, the link 30 and the pin 28 will cooperate to rock the lever 23 clockwise as viewed in Figure 2. This will operate mechanism described hereinafter for automatically disabling the machine.

The mechanism described above is generally similar to mechanism which is now well known and does not in itself constitute the present invention. The invention comprises other mechanism to be described and the combination of such other mechanism with some of the known mechanism referred to above.

Improved mechanism for preventing operation of the keys when the machine is not conditioned for operation is disclosed in Figures 1, 2 and 4 as including a control element in the form of a key locking blade 34 equipped with a shaft 35 mounted at 36 on the frame A for pivotal or rocking movements. The top edge of an upwardly extending part 34$^a$ of the control element normally is disposed in a recess 37$^a$ in a part 37 extending downwardly from the key lever 12, and is adapted to be disposed in similar recesses formed in projections extending downwardly from the other key levers, not shown. With the control element 34 in the normal position referred to and shown in full lines in Figures 1, 2 and 4, the key levers cannot be depressed, being blocked by the blade part 34$^a$.

Mechanism for moving the control element 34 to an actuated position when the machine is conditioned for operation to enable the key levers to be depressed includes a spring 38 connected to an ear 39 on the control element 34 and a stud 40 on the machine frame A so as to urge the control element 34 to rock counterclockwise to displace its upper edge part 34$^a$ from the recess 37$^a$. When the machine is not conditioned for operation, the control element 34$^a$ is maintained in its normal position shown in full lines in Figures 1, 2 and 4 by the curved end 41$^a$ of a lever 41 pivoted on the frame at 42, the lever end 41$^a$ engaging a finger 34$^b$ on the control element 34 just above a curved part 34$^c$ of the finger. When the machine is being conditioned for operation the lever 41 is rocked counterclockwise as viewed in Figures 1 and 2 so as to move its curved end 41$^a$ below the curved part 34$^c$ of the finger 34$^b$ whereupon the spring 38 will rock the control element counterclockwise to disengage its upper edge part 34$^a$ from the key lever projection 37, the element 34 and the lever 41 then being positioned as indicated in dotted lines in Figure 4. When the machine is being restored to its normal or nonoperated condition the curved end 41$^a$ of the lever 41 is moved upwardly against the curved part 34$^c$ of the finger 34$^b$ of the control element 34 to rock the latter clockwise against the urge of the spring 38 and to restore the control element to its key lever blocking position. The control element 34 is shown as being provided with a slotted ear 34$^d$ which is adapted to be connected to carriage operated line lock mechanism, not shown, for moving the control element to its key blocking position when the carriage reaches the end of a line of typing, irrespective of the position of the lever 41. The lever 41 is connected to the master control device E by means to be described later so that the control element 34 may be operated concurrently with the operation of other parts which condition the machine for operation or non-operation.

The motor 19 may be of any suitable kind, but is shown as being of the capacitor type including a condenser or capacitor 43. Electric power is supplied from a source represented as the conventional supply line and connectors 44 and 45 shown in Figure 3. The power source is adapted to be connected to prongs 46 and 47 of a conventional plug 48 from which lead conductors 49 and 50 connected respectively to the prongs 46 and 47.

A switch, generally designated S, is provided for controlling the operation of the motor 19, and means is provided for effecting opening of the switch and restoring of the machine parts to normal or non-operating condition in response to failure of the power delivery or supply irrespective of the cause of the failure. The switch structure includes a frame 51 formed of sheet metal and comprising a horizontal base 51$^a$, a vertical back 51$^b$ and a horizontal top 51$^c$ turned in over the base 51$^a$. The switch frame 51 is supported by a bracket 51$^d$ secured to the main frame A by screws 51$^e$. Mounted on the switch frame top 51$^c$ is a stack of sheets 52 of insulating material secured to the frame top 51$^c$ by two screws 53 threaded at their lower ends into the frame top 51$^c$, metal bearing or clamping plates 53$^a$ being interposed between the screw heads and the topmost insulating material sheet 52. On opposite sides of, that is above and below, the third insulating sheet 52 from the top of the stack are positioned resilient upper and lower switch arms 54 and 55 which are insulated from the screws 53 by sleeves or bushings 56 of insulating material. The upper or primary switch arm 54 is provided with a contact 54ª which, in the normal or "open" position of the switch, is spaced from a contact 55ª on the lower or secondary switch arm 55. The switch is connected in circuit with the motor 19 and the source of supply by the conductor 49 leading to the motor terminal 19ª, the conductor 50 leading to the secondary switch arm 55, a conductor 57 leading from the primary switch arm 54, and a branch conductor 58 leading from the conductor 57 to the motor terminal 19ᵇ. When the switch is closed by engagement of the contacts 54ª and 55ª the motor will be connected across the supply source 44—45 and will operate to drive the snatch roll 17. The condenser or capacitor 43 is connected to the motor by a conductor 43ª and by a conductor 43ᵇ and the conductor 58.

Mechanism for closing the switch S includes a plate 59 of insulating material secured at 60 to an L-shaped member 61, in turn secured at 62 to the front end of a resilient strip 63 anchored at its rear end at 64 to an actuator or armature 65 of magnetic material, the rear end 65ª of which extends through a slot 66 in the back 51ᵇ of the frame 51. The bottom of the slot 66 provides a fulcrum for the actuator 65, the latter being biased or urged to the position shown in full lines in Figures 1, 2, 3 and 8 by a spring 67 connected to the rear end 65ª of the actuator and to an anchor 68 secured to the back 51ᵇ of the frame 51. A slot 59ª in the plate 59 receives the front end portion of the primary switch arm 54, the arrangement being such that when the plate 59 is moved downwardly from the position shown in full lines in Figures 1, 2, 3 and 8 to the position shown in dotted lines in Figure 8 the primary switch arm 54 is flexed counterclockwise so as to bring its contact 54ª into engagement with the contact 55ª on the secondary switch arm 55. This will close the circuit previously outlined so as to start operation of the motor 19.

Mechanism is provided for operating the switch S by movement of the master control device E. A slot 59ᵇ in the plate 59 receives the rear end 69ª of a lever 69 pivoted intermediate its ends at 70 and having its front end 69ᵇ provided with a screw stud 71 one end of which is formed as a pin 71ª which projects into a slot or forked end 41ᶜ at the rear end of the lever 41. As shown in Figure 5, the screw stud 71 is formed with an enlarged part 71ᵇ which provides a shoulder 71ᶜ bearing against the lever end 69ᵇ so as to space the head of the screw 71 from the lever end 69ᵇ and provide a free pivotal bearing between the stud 71 and the lower end of a link 72 the upper end of which is pivoted at 73 to a rearwardly extending arm 23ᶜ of the lever 23.

When the master control device E is moved from its "off" to its "on" position, the link 72 is raised so as to rock the lever 41 counterclockwise and effect movement of the control element 34 to its actuated position, and simultaneously the lever 69 will be rocked clockwise to move the plate 59 downwardly and will move the contact 54ª into engagement with the contact 55ª, close the switch S and complete the motor circuit. In accordance with the invention, an electromagnetic means is operable in conjunction with the master control device E and serves the important purpose of holding the switch S closed against the bias of the spring 67 when power is being supplied from the source 44—45, and may also serve to assist in moving the control mechanism parts for conditioning the machine for operation. The electromagnetic means also is so arranged as to respond to failure of the power supply for automatically restoring the parts to positions corresponding to non-operation of the machine. In the illustrated construction, an electromagnet generally designated 74 is supported on the bottom 51ª of the switch frame 51 and is equipped with positioning fingers 75—75 which extend through slots 76—76 in the switch frame back 51ᵇ. The electromagnet includes the usual winding having terminals 77—78, and a core 79, the arrangement being such that when the electromagnet is energized it attracts the armature or actuator 65 so as to urge it downwardly and to maintain it in operated position against the urge of the spring 67. The energizing circuit for the magnet includes the conductor 49 which leads through a branch conductor 80 to the winding terminal 77, the conductor 50, the switch S, and the conductor 57 which leads to the winding terminal 78. When the switch S is closed the electromagnet winding will be connected across the supply line 44—45 so as to attract the armature 65.

*Operation*

Operating phases of the mechanism have been explained in connection with the description of the mechanism structure, but the overall operation and related functioning of various parts may be reviewed. When the machine is not in use or is disabled the master control device E will be in the "off" position shown in Figures 1 and 2, the control element 34 will be in its key blocking position, the pin 28 of the lever 23 will be positioned near the rear of the slot 29 in the link 30, and the switch S will be open. Consequently, the electrically powered mechanism P will not operate, the keys 12 cannot be depressed, but the hood H may be raised. The control device E and the associated parts will be biased to and maintained in their positions corresponding to non-operation of the machine by the spring 67 which holds the armature 65 in the position shown in Figures 1, 2 and 3 and in full lines in Figure 8 in which it is limited or stopped in its spring-biased movement by engagement of the strip 63 with the switch frame top 51ᶜ.

In order to condition the machine for operation, the control device E is moved to the position shown in dotted lines in Figure 2, rocking of the lever 23 positioning the pin 28 at the front end of the slot 29 in the link 30. Such rocking of the lever 23 also raises the link 72 to rock the lever 41 counterclockwise, thereby moving the end 41ª of the lever to the position shown in dotted lines in Figure 4 and effecting movement of the control element 34 to its actuated position by the spring 38, and enabling the keys 12 to be depressed. Raising of the link 72 also rocks the lever 69 clockwise to cause its end 69ª to move the insulating plate 59 downwardly to bring the primary switch contact 54ª into engagement with the secondary switch contact 55ª, thereby closing both the motor circuit and the electromagnet circuit. The electromagnet 74 having thus been energized, attracts the armature 65 so as to move the plate 59 further downwardly as permitted by yielding of the flexible switch arms 54 and 55 and the biasing spring 67. The final part of the movement of the armature 65 is thus effected partially by the electromagnetic attraction which acts through the lever 69 and the link 72 to assist in moving the control device E fully to its "on" position. The attraction of the armature 65 by the electromagnet also acts through the plate 59, the lever 69, and the lever 41 to effect movement of the lever end 41ª below the curved part 34ᶜ of the control element 34, and thus effects complete movement of the control element to its actuated position by the spring 38. Thus, the electromagnet lessens the effort required to move the control device E fully to its "on" position and to set the associated parts in positions for conditioning the machine for operation.

In the ordinary use of the machine, when it is desired to restore its parts to normal positions for a period of non-use the control device E is moved towards its "off" position, causing the lever 23, the link 72, the levers 41 and 69, and the insulating plate 59 to move toward their normal positions. The first part of the restoring movement will be accompanied by upward movement of both switch arms 54 and 55 while their contacts 54ª and 55ª remain in engagement so that the circuit to the electromagnet will still be closed and the armature 65 consequently will be held down. The preliminary restoring movement of the parts may, nevertheless, take place while the armature 65 is still held down because of the upward yielding of the resilient strip member 63 which provides a one-way-acting connection between the plate member 59 and the armature 65. When the secondary switch arm 55 has been restored to its normal position, further upward movement of the primary switch arm 54 will disengage its contact 54ª from the secondary switch contact 55ª, thereby opening both the motor circuit and the electromagnetic circuit. De-energizing of the electromagnet will enable the biasing spring 67 to continue rocking of the armature 65 until the latter or the strip 63 thereon is stopped by the switch frame top 51ᶜ, the spring 67 thereby assisting in returning the control element 34 and the master control device E to their normal positions.

If the power supply should fail for any cause when the machine is conditioned for operation, such as by accidental disconnection of the plug prongs 46, 47 from the supply line ends 44 and 45, the electromagnet will be de-energized and the spring 67 itself will return all of the control mechanism parts to their normal positions without necessity of manual operation of the control device E. Therefore, subsequent restoration of available power accomplished for example by re-connecting the plug prongs 46, 47 to the supply line ends 44 and 45 will not start the operating means P, since the switch S will have been opened by the biasing spring 67.

If the hood H is raised when the machine is conditioned for operation, the front end of the link slot 30 will push against the pin 28 to rock the lever 23 clockwise as viewed in Figure 2, thus superseding the holding action of the electromagnet and opening the switch S and restoring the entire machine to its normal or non-operating condition.

The mechanism disclosed embodies the invention in a preferred form, but it is intended that the disclosure be illustrative rather than definitive. The invention is defined in the appended claims.

We claim:

1. In a typewriter or like machine, a frame; a cover; means mounting said cover on said frame for movements to open and closed positions selectively; electrically powered operating means; an operation initiating member; a control element settable selectively in a normal position in which it prevents movement of said operation initiating member and in an actuated position in which it enables movement of said operation initiating member; a switch for controlling operation of said operating means; a master control device settable selectively in a first position for disabling said machine from operating and in a second position for conditioning said machine for operation; means connected to said master control device and to said cover and being responsive to movement of said cover from its closed position to its open position when said master control device is in its second position for moving said master control device to its first position; means connecting said master control device to said control element for effecting movement of the latter to its normal position in response to movement of said master control device to its said first position and for effecting movement of said control element to its actuated position in response to movement of said master control device to its said second position; means connecting said master control device to said switch for setting the latter in "off" position in response to movement of said master control device to its said first position and for setting said switch in its "on" position in response to movement of said master control device to its said second position; means biasing said master control device to its said first position; and electromagnetic means energizable in response to movement of said master control device to its said second position for retaining said master control device in its said second position against the urge of said biasing means, said master control device being automatically restorable to its said first position by said biasing means in response to de-energizing of said electromagnetic means.

2. In a typewriter or like machine, a frame; a cover; means mounting said cover on said frame for movements to open and closed positions selectively; electrically powered operating means; an operation initiating member; a control element settable selectively in a normal position in which it prevents movement of said operation initiating member and in an actuated position in which it enables movement of said operation initiating member; a switch for controlling operation of said operating means; a master control device settable selectively in a first position for disabling said machine from operating and in a second position for conditioning said machine for operation; means connected to said master control device and to said cover and being responsive to movement of said cover from its closed position to its open position when said master control device is in its second position for moving said master control device to its first position; means connecting said master control device to said control element for effecting movement of the latter to its normal position in response to movement of said master control device to its said first position and for effecting movement of said control element to its actuated position in response to movement of said master control device to its said second position; means connecting said master control device to said switch for setting the latter in "off" position in response to movement of said master control device to its said first position and for setting said switch in its "on" position in response to movement of said master control device to its said second position; spring means biasing said master control device to its said first position; and electromagnetic means energizable in response to movement of said master control device to its said second position for retaining said master control device in its said second position against the urge of said spring means, said master control device being automatically restorable to its said first position by said spring means in response to de-energizing of said electromagnetic means.

3. In a typewriter or like machine, a frame; a cover; means mounting said cover on said frame for movements to open and closed positions selectively; electrically powered operating means; an operation initiating member; a control element settable selectively in a normal position in which it prevents movement of said operation initiating member and in an actuated position in which it enables movement of said operation initiating member; a switch for controlling operation of said operating means; a master control device settable selectively in a first position for disabling said machine from operating and in a second position for conditioning said machine for operation; means connected to said master control device and to said cover and being responsive to movement of said cover from its closed position to its open position when said master control device is in its second position for moving said master control device to its first position; means connecting said master control device to said control element for effecting movement of the latter to its normal position in response to movement of said master control device to its said first position and for effecting movement of said control element to its actuated position in response to movement of said master control device to its said second position; means connecting said master control device to said switch for setting the latter in "off" position in response to movement of said master control device to its said first position and for setting said switch in its "on" position in response to movement of said master control device to its said second position; means biasing said master control device to its said first position; and electromagnetic means in circuit with said switch and being energizable in response to movement of said master control device to its said second position for retaining said master control device in its said second position against the urge of said biasing means, said master control device being automatically restorable to its said first position by said biasing means in response to de-energizing of said electromagnetic means.

4. In a typewriter or like machine, a frame; a cover; means mounting said cover on said frame for movements to open and closed positions selectively; operating means adapted to be operated electrically by power from a suitable source; an operation initiating member; a control element settable selectively in a normal position in which it prevents movement of said operation initiating member and in an actuated position in which it enables movement of said operation initiating member; a switch for controlling operation of said operating means by power from said source; a master control device settable selectively in a first position for disabling said machine from operating and in a second position for conditioning said machine for operation; means connected to said master control device and to said cover and being responsive to movement of said cover from its closed position to its open position when said master control device is in its second position for moving said master control device to its first position; means connecting said master control device to said control element for effecting movement of the latter to its normal position in response to movement of said master control device to its said first position and for effecting movement of said control element to its actuated position in response to movement of said master control device to its said second position; means connecting said master control device to said switch for setting the latter in "off" position in response to movement of said master control device to its said first position and for setting said switch in its "on" position in response to movement of said master control device to its said second position; means biasing said master control device to its said first position; and electromagnetic means energizable by power from said source in response to movement of said master control device to its said second position for retaining said master control device in its said second position against the urge of said biasing means, said master control device being automatically restorable to its said first position by said biasing means in response to de-energizing of said electromagnetic means caused by cessation of delivery of power from said source to said operating means.

5. In a typewriter or like machine, a frame; a cover; means mounting said cover on said frame for movements to open and closed positions selectively; operating means adapted to be operated electrically by power from a suitable source; an operation initiating member; a control element settable selectively in a normal position in which it prevents movement of said operation initiating member and in an actuated position in which it enables movement of said operation initiating member; a switch for controlling operation of said operating means by power from said source; a master control device settable selectively in a first position for disabling said machine from operating and in a second position for conditioning said machine for operation; means connected to said master control device and to said cover and being responsive to movement of said cover from its closed position to its open position when said master control device is in its second position for moving said master control device to its first position; means connecting said master control device to said control element for effecting movement of the latter to its normal position in response to movement of said master control device to its said first position and for effecting movement of said control element to its actuated position in response to movement of said master control device to its said second position; means connecting said master control device to said switch for setting the latter in "off" position in response to movement of said master control device to its said first position and for setting said switch in its "on" position in response to movement of said master control device to its said second position; spring means biasing said master control device to its said first position; and electromagnetic means in circuit with said switch and being energizable by power from said source in response to movement of said master control device to its said second position for retaining said master control device in its said second position against the urge of said spring means, said master control device being automatically restorable to its said first position by said spring means in response to de-energizing of said electromagnetic means caused either by setting of said switch in its "off" position by said master control device or cessation of delivery of power from said source to said operating means irrespective of the setting of said switch.

6. In a typewriter or like machine, a frame; a cover; means mounting said cover on said frame for movements to open and closed positions selectively; operating means adapted to be operated electrically by power from a suitable source; means including an electromagnet for maintaining said operating means electrically connected to said source; and means automatically operable by movement of said cover to its open position for superseding the action of said electromagnet and disconnecting said operating means from said source.

7. In a typewriter or like machine, a frame; a cover; means mounting said cover on said frame for movements to open and closed positions selectively; operating means adapted to be operated electrically by power from a suitable source; means including an electromagnet in circuit with said source for maintaining said operating means electrically connected to said source during continued supplying of power from said source to said operating means and being automatically operable in response to de-energizing of said electromagnet due to failure of delivery of power from said source irrespective of the cause of power delivery failure for disconnecting said operating means from said source; and means automatically operable by movement of said cover to its open position for superseding the action of said electromagnet and disconnecting said operating means from said source.

8. In a typewriter or like machine, a frame; a cover; means mounting said cover on said frame for movements to open and closed positions selectively; operating means adapted to be operated electrically by power from a suitable source; means including an electromagnet energizable by power from said source for maintaining said operating means electrically connected to said source during continued supplying of power from said source to said operating means; a spring automatically operable in response to de-energizing of said electromagnet caused by cessation of delivery of power from said source for disconnecting said operating means from said source; and means automatically operable by movement of said cover to its open position for superseding the action of said electromagnet and disconnecting said operating means from said source.

9. In a typewriter or like machine, a frame; a cover; means mounting said cover on said frame for movements to open and closed positions selectively; operating means adapted to be operated electrically by power from a suitable source; a switch for controlling delivery of power from said source to said operating means; a spring for biasing said switch to open position; an electromagnet in circuit with said source and being energizable in response to closing of said switch for maintaining said switch in closed position, said spring being operable automatically upon de-energizing of said electromagnet for opening said switch; and means connected to said switch and being effective when said switch is in its closed position for opening said switch in response to movement of said cover from its closed position to its open position.

10. In a power operated typewriter or like machine, electrically powered operating means; an operation initiating member; a control element settable selectively in a normal position in which it prevents movement of said operation initiating member and in an actuated position in which it enables movement of said operation initiating member; means including a switch for connecting said operating means to an electrical power supply; means biasing said switch to open position and biasing said control element to its said normal position; an electromagnet adapted when energized to maintain said switch in its closed position and to render ineffective the biasing of said control element to its normal position; and means including said switch for connecting said electromagnet in circuit with said electrical power supply.

11. In a power operated typewriter or like machine, electrically powered operating means; an operation initiating member; a control element settable selectively in a normal position in which it prevents movement of said operation initiating member and in an actuated position in which it enables movement of said operation initiating member; means including a switch for connecting said operating means to an electrical power supply; means biasing said switch to open position and biasing said control element to its said normal position; an electromagnet adapted when energized to maintain said switch in its closed position and to render ineffective the biasing of said control element to its normal position; means including said switch for connecting said electromagnet in circuit with said electrical power supply; and manually operable means for closing said switch when said electromagnet is deenergized and for opening said switch while said electromagnet is energized.

12. In a power operated typewriter or like machine, electrically powered operating means; an operation initiating member; a control element settable selectively in a normal position in which it prevents movement of said operation initiating member and in an actuated position in which it enables movement of said operation initiating member; means including a switch for connecting said operating means to an electrical power supply; an actuator positionable for opening and closing said switch; means connecting said actuator to said control element for positioning said control element in its said normal position when said actuator is positioned to open said switch and for effecting positioning of said control element in its said actuated position when said actuator is positioned to close said switch; means biasing said actuator to its position for opening said switch and for positioning said control element in its said normal position; an electromagnet adapted when energized to urge said actuator against said bias; means including said switch for connecting said electromagnet to said power supply; and manually operable means for moving said actuator sufficiently against said bias to effect preliminary movement of the means connecting the actuator to the control element and then to close said switch thereby to energize said electromagnet which then urges said actuator to move further against said bias to effect positioning of said control element in its actuated position.

13. In a power operated typewriter or like machine, electrically powered operating means; an operation initiating member; a control element settable selectively in a normal position in which it prevents movement of said operation initiating member and in an actuated position in which it enables movement of said operation initiating member; means including a switch for connecting said operating means to an electrical power supply; an actuator positionable for opening and closing said switch; means connecting said actuator to said control element for positioning said control element in its said normal position when said actuator is positioned to open said switch and for effecting positioning of said control element in its said actuated position when said actuator is positioned to close said switch; means biasing said actuator to its position for opening said switch and for positioning said control element in its said normal position; an electromagnet adapted when energized to urge said actuator against said bias; means including said switch for connecting said electromagnet to said power supply; manually operable means for moving said actuator sufficiently against said bias to effect preliminary movement of the means connecting the actuator to the control element and then to close said switch thereby to energize said electromagnet which then urges said actuator to move further against said bias to effect positioning of said control element in its actuated position; and manually operable means for opening said switch while said electromagnet is energized thereby to enable said biasing means to operate said actuator to return said control element to its said normal position.

14. In a power operated typewriter or like machine, electrically operable operating means; means including a master control device settable selectively in an "off" position corresponding to non-operation of said machine and in an "on" position for conditioning said machine for operation of its instrumentalities by said operating means; means including a switch for connecting said operating means to an electrical power supply; means biasing said switch to open position and biasing said master control device to "off" position; an electromagnet connected in circuit with said switch and said power supply; an armature responsive to energizing of said electromagnet; and means connecting said armature to both said switch and said master control device whereby energizing of said electromagnet and response by said armature will maintain said switch closed and said master control device in "on" position against the urge of said biasing means, said biasing means being responsive to deenergizing of said electromagnet for restoring said master control device to "off" position.

15. In a power operated typewriter or like machine, electrically operable operating means; means including a master control device settable selectively in an "off" position corresponding to non-operation of said machine and in an "on" position for conditioning said machine for operation of its instrumentalities by said operating means; an electromagnet; an armature responsive to energizing of said electromagnet; a movable primary switch contact; a movable secondary switch contact between said primary switch contact and said armature, said primary and secondary switch contacts being mutually disengageable and engageable for controlling delivery of electrical power from said supply to said operating means and to said electromagnet; means biasing said armature away from said electromagnet and biasing said primary switch contact away from said secondary switch contact; and means connecting together said master control device, said primary switch contact and said armature whereby initial movement of said master control device from "off" position towards "on" position will move said primary switch contact into engagement with said secondary switch contact to effect delivery of power to said operating means and energizing of said electromagnet and overcoming of the bias exerted by said biasing means by continued movement of said armature under the influence of said electromagnet.

16. In a power operated typewriter or like machine, electrically operable operating means; means including a master control device settable selectively in an "off" position corresponding to non-operation of said machine and in an "on" position for conditioning said machine for operation of its instrumentalities by said operating means; an electromagnet; an armature responsive to energizing of said electromagnet; a resiliently mounted primary switch contact; a resiliently mounted secondary switch contact between said primary switch contact and said armature, said primary and secondary switch contacts being mutually disengageable and engageable for controlling delivery of electrical power from said supply to said operating means and to said electromagnet; spring means biasing said armature away from said electromagnet and biasing said primary switch contact away from said secondary switch contact; and means connecting together said master control device, said primary switch contact and said armature whereby initial movement of said master control device from "off" position towards "on" position will move said primary switch contact into engagement with said secondary switch contact to effect delivery of power to said operating means and energizing of said electromagnet and overcoming of the bias exerted by said spring means by continued movement of said armature under the influence of said electromagnet, said primary switch contact being disengageable from said secondary switch contact by partial movement of said master control device from "on" position towards "off" position whereby resultant deenergizing of said electromagnet enables said spring means to urge said master control device toward "off" position.

17. In a power operated typewriter or like machine, electrically powered operating means; means including a normally open switch for connecting said operating means to an electrical power supply; means biasing said switch to its normally open position; an electromagnet adapted when energized to maintain said switch in its closed position; means connecting said electromagnet in circuit with said power supply through said switch; and means for closing said switch for simultaneously effecting connection of said operating means to said power supply and energizing of said electromagnet, said biasing means being automatically operable in response to deenergizing of said electromagnet for opening said switch.

18. In a power operated typewriting or like machine, operating means adapted to be operated electrically by power from a suitable source; means engageable with said operating means for being operated thereby; a switch for controlling delivery of power from said source to said operating means; an electromagnet in circuit with said source and being energizable in response to closing of said switch; an armature operable from a normal position to an actuated position by energizing of said electromagnet; a manually operable device; means connecting said manually operable device to said switch for closing and opening said switch by manual effort; and one-way-acting means connecting said armature to said first connecting means for causing said armature to be moved towards its actuated position by operation of said manually operable device and for enabling said connecting means to be moved by said manually operable device to open said switch while said armature remains in its actuated position.

19. In a power operated typewriting or like machine, operating means adapted to be operated electrically by power from a suitable source; means engageable with said operating means for being operated thereby; a switch for controlling delivery of power from said source to said operating means; an electromagnet in circuit with said source and being energizable in response to closing of said switch; an armature operable from a normal position to an actuated position by energizing of said electromagnet; a manually operable device; a first member connecting said manually operable device to said switch for closing and opening said switch by manual effort; a resilient member connected to said first member and having one-way-acting connection to said armature for moving said armature towards its actuated position in response to the operation of said manually operable device which closes said switch, and for enabling said first member to be moved by said manually operable device for opening said switch while said armature remains in its actuated position.

References Cited in the file of this patent

UNITED STATES PATENTS

| 2,191,706 | Cooke | Feb. 27, 1940 |
| 2,407,195 | Von Reppert | Sept. 3, 1946 |
| 2,675,902 | Kupper | Apr. 20, 1954 |